United States Patent [19]
Urakawa

[11] Patent Number: 6,016,156
[45] Date of Patent: Jan. 18, 2000

[54] IMAGE FORMING APPARATUS

[75] Inventor: Toshio Urakawa, Yamatokoriyama, Japan

[73] Assignee: Sharp Kabushiki Kaisha, Osaka, Japan

[21] Appl. No.: 09/021,636

[22] Filed: Feb. 10, 1998

[30]     Foreign Application Priority Data

Feb. 24, 1997   [JP]   Japan ..................................... 9-038659

[51] Int. Cl.[7] ....................................................... B41J 2/47
[52] U.S. Cl. .......................... 347/134; 347/132; 347/243
[58] Field of Search .................................. 347/132, 134, 347/129, 139, 233, 241, 242, 243

[56]               References Cited

U.S. PATENT DOCUMENTS

| 5,018,805 | 5/1991 | Kessler . | |
|---|---|---|---|
| 5,243,359 | 9/1993 | Fisli . | |
| 5,337,136 | 8/1994 | Knapp et al. | 355/326 |
| 5,757,413 | 5/1998 | Andrews | 347/256 |
| 5,784,094 | 7/1998 | Ota et al. | 347/243 |

FOREIGN PATENT DOCUMENTS

| 6-143686 | 5/1994 | Japan . |
|---|---|---|
| 8-160694 | 6/1996 | Japan . |

*Primary Examiner*—Richard Moses

*Attorney, Agent, or Firm*—Dike, Bronstein, Roberts & Cushman, LLP; David G. Conlin

[57]                ABSTRACT

The invention avoids an increase in the number of parts and components which form an apparatus for forming an image, and hence, prevents a main body of the image forming apparatus from completed in a large size. To this end, the image forming apparatus comprises yellow, magenta, cyan and black photosensitive drums 7Y, 7M, 7C and 7B, chargers 8Y, 8M, 8C and 8B which respectively charges the photosensitive drums 7Y, 7M, 7C and 7B which correspond to the respective colors, laser diodes 11Y, 11M, 11C and 11B which generate laser beams representing the respective colors in accordance with image signals, the laser beams exposing the respective photosensitive drums 7Y, 7M, 7C and 7B so that electrostatic latent images are formed on the photosensitive drums 7Y, 7M, 7C and 7B which correspond to the respective colors, developing members 31Y, 31M, 31C and 31B corresponding to the respective colors for supplying developing agents, a polygon mirror 13 for scanning the laser beams representing the respective colors emitted from the laser diodes 11Y, 11M, 11C and 11B, and a reflection mirror 15 for reflecting the laser beams which are indicative of the respective colors in such a manner that the laser beams intersect with each other at the same intersection B and thereafter respectively irradiate the photosensitive drums 7Y, 7M, 7C and 7B which correspond to the respective colors.

4 Claims, 2 Drawing Sheets

IMAGE FORMING APPARATUS

BACKGROUND OF THE INVENTION

1. Field of the Invention

The present invention relates to an apparatus for forming an image which comprises a plurality of image carriers, a plurality of charging means for charging the respective image carriers, light beam generating means for generating a plurality of light beams to which the image carriers are exposed so that an electrostatic latent image is formed on each image carrier in accordance with image signals, and a plurality of developing agent supplying means for supplying a developing agent which develops the electrostatic latent images on the respective image carriers.

2. Description of the Related Art

An example of a conventional image forming apparatus of an electrophotographic printing type for forming a multi-color image on paper is disclosed in Japanese Unexamined Patent Publications JP-A 6-143686 (1994) and JP-A 8-160694 (1996), for example.

The former discloses a 3-level tandem printer which is a 4-color printer having a tandem structure in which three 3-level engines utilizing an adjacent spot technique for 3-level imaging are disposed. Each 3-level engine comprises a photoconductive drum which serves as a photosensitive member, a charging part for uniformly charging a surface of the photoconductive drum, and a scanning apparatus for exposing the charged surface of the photoconductive drum. The 3-level engines each comprise the scanning apparatus, and therefore, the 3-level tandem printer as a whole requires to comprise three scanning apparatuses whose structures are independent of each other. Accordingly the number of parts and components which constitute the printer increases, resulting in an upsized printer. In particular, each scanning apparatus tends to require a large number of parts and components because it is composed of an optical device, a sensor, a laser, and a resident control device, and hence, a large installment space is required, which in turn increases the size of the printer.

Meanwhile, the image forming apparatus disclosed in JP-A 8-160694 comprises a control part for outputting image signals for yellow, magenta and cyan with delay by different time intervals, a laser diode for receiving the image signals and converting the image signals into yellow, magenta and cyan optical signals, a polygon mirror, which includes yellow, magenta and cyan reflection surfaces which correspond respectively to the optical signals and have different inclination angles from each other, for receiving the optical signals from the laser diode at the reflection surfaces while rotating and reflecting the optical signals respectively in three directions which are at different angles from each other, yellow, magenta and cyan converging lenses, which are disposed on optical paths of the respective optical signals which are reflected by the polygon mirror, for receiving and converging the respective optical signals, yellow, magenta and cyan reflection mirrors for respectively reflecting the optical signal which passed the respective converging lenses, and yellow, magenta and cyan photoconductive drums which are disposed in correspondence with the respective reflection mirrors to be exposed to the respective optical signals which are reflected by the respective reflection mirrors.

In the image forming apparatus which has such a structure described above, since yellow, magenta and cyan laser light beams from the laser diode are reflected by the polygon mirror at the reflection surfaces of different inclination angles from each other in the three directions, in order to reflect each laser light beam at the associated photoconductive drum, the three reflection mirrors for yellow, magenta and cyan are necessary, and therefore, it is necessary to use an increased number of parts and components and ensure spaces for disposing the three reflection mirrors, which in turn increases the size of the main body of the image forming apparatus.

SUMMARY OF THE INVENTION

The invention has been made to solve the problem addressed above. Accordingly, an object of the invention is to provide an image forming apparatus which uses a decreased number of parts and components and accordingly has a main body small in size by constructing the image forming apparatus so that a plurality of light beams from a scanning mirror are reflected by one reflection mirror.

To achieve the object above, in a first aspect of the invention, an image forming apparatus comprises a plurality of image carriers; a plurality of charging means for charging the respective image carriers; light beam generating means for generating a plurality of light beams to which the image carriers are exposed so that an electrostatics latent image is formed on each image carrier in accordance with image signals; and a plurality of developing agent supplying means for supplying a developing agent which develops the electrostatic latent images on the respective image carriers, the image forming apparatus further comprising a scanning mirror for scanning the plurality of light beams from the light beam generating means, and a reflection mirror for causing the plurality of light beams which are scanned by the scanning mirror, to intersect with each other at one and the same point, and thereafter irradiating the plurality of light beams respectively onto the image carriers.

In the image forming apparatus of the invention, the plurality of light beams from the light beam generating means, which impinge upon the same reflection surface of the scanning mirror, are scanned by the scanning mirror, and reflected at the associated reflection surfaces of the reflection mirror which correspond to the respective light beams, and after all the light beams intersect with each other at the same point, the respective image carriers are exposed to the light beams. Hence, it is possible to ensure that the plurality of light beams are reflected by the single reflection mirror, and therefore, it is possible to decrease the number of parts and components and reduce a space for disposing the reflection mirror and the size of the main body of the image forming apparatus.

In a second aspect of the invention, the light beam generating means emits the respective light beams parallel to each other toward the scanning mirror in the image forming apparatus.

In this structure, it is possible to ensure that the single reflection mirror reflects the plurality of light beams onto the respective image carriers in an easy manner.

Further, since the plurality of light beams are emitted parallel to each other, the reflection mirror for reflecting the light beams onto the respective image carriers can be realized with a small and simple structure.

In a third aspect of the invention, the image forming apparatus further comprises light beam correcting means for correcting the plurality of light beams, the light beam correcting means being disposed in a vicinity of the intersection of the plurality of light beams which are reflected by the reflection mirror, on the image carriers side.

In this structure, it is possible to ensure that the plurality of light beams are corrected by the only one light correcting means.

In addition, since the light beam correcting means is disposed in the vicinity of the intersection of the plurality of light beams, optical paths of the plurality of light beams do not yet expand in a wide range, which makes it possible to form the light beam correcting means compact which corrects the plurality of light beams, reduces a space for disposing the light beam correcting means, and further reduces the size of the main body of the image forming apparatus.

In a fourth aspect of the invention, the respective image carriers are disposed on a concentric circle about the intersection of the plurality of light beams which are reflected by the reflection mirror.

In this structure, it is possible to ensure that the plurality of light beams which are reflected by the reflection mirror are irradiated directly upon the respective image carriers without altering the optical paths of the plurality of light beams while the plurality of light beams travel toward the respective image carriers.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
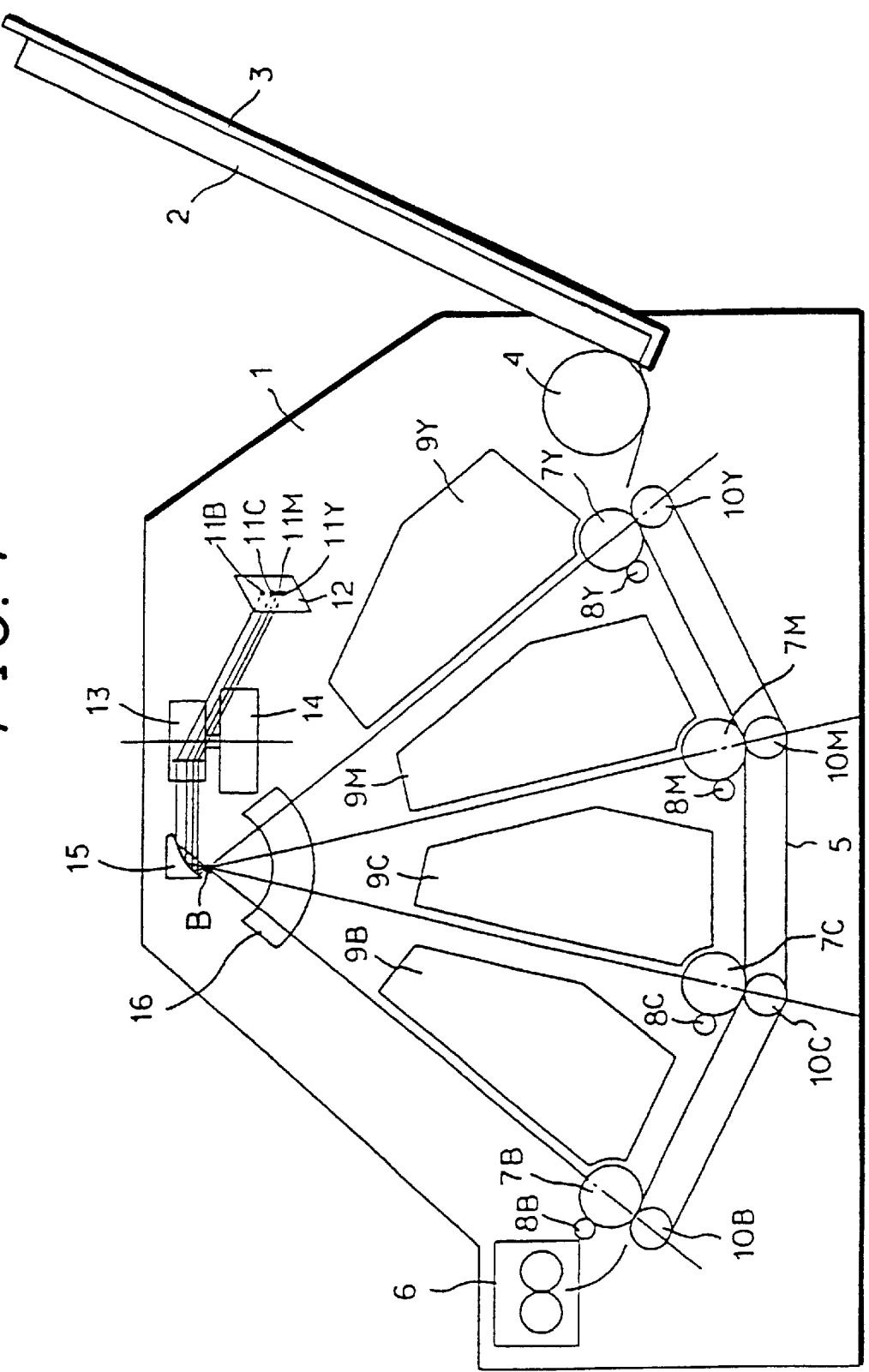
FIG. 1 is a schematic cross sectional view of a multi-color laser printer which is an apparatus for forming an image according to the invention.

Now referring to the drawings, preferred embodiments of the invention are described below.

Figure 2:
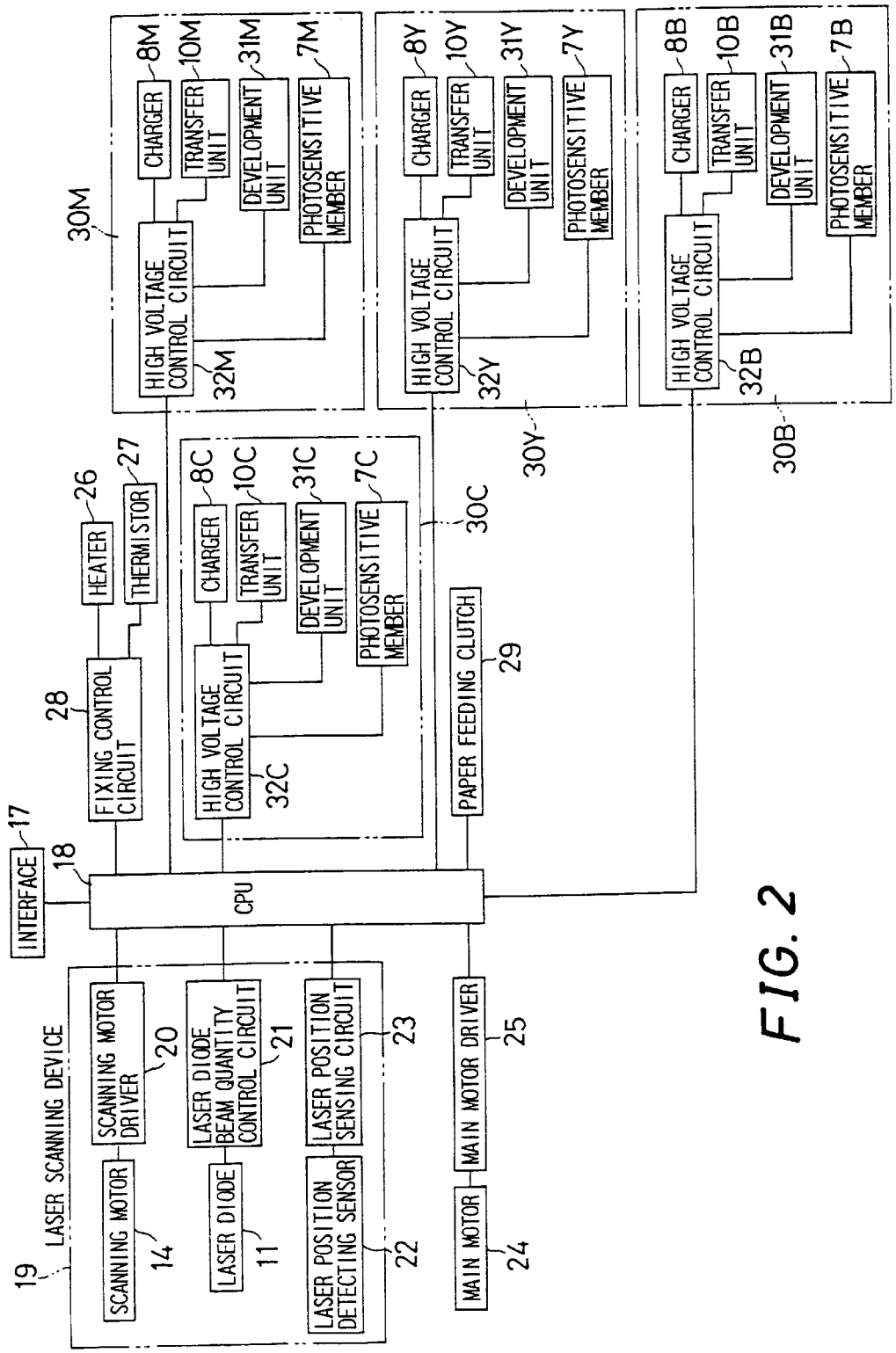
FIG. 2 is a block diagram showing an electric circuit of the multi-color laser printer which is shown in FIG. 1.

A multi-color laser printer which is an apparatus for forming an image according to a preferred embodiment of the invention will be described with reference to FIGS. 1 and 2.

In the multi-color laser printer according to the invention, a paper tray 3 containing papers 2 is detachably attached to a rear portion of a printer main body 1, a pick up roller 4 for feeding the papers 2 contained in the paper tray 3 one by one is disposed on the downstream side to the paper tray 3 in a paper transporting direction, a transportation belt 5 is disposed which transports the paper 2 which is fed by the pick up roller 4, a fixing unit 6 for fixing a toner image which is transferred on the paper 2 is disposed on the downstream side to the transportation belt 5 in the paper transporting direction, and a discharging roller (not shown) for discharging the paper 2 with the toner image fixed thereon from the printer main body 1 is disposed on the downstream side to the fixing unit 6 in the paper transporting direction.

Above the transportation belt 5, a yellow photosensitive drum 7Y, a magenta photosensitive drum 7M, a cyan photosensitive drum 7C, and a black photosensitive drum 7B are disposed in this order from the upstream side in the paper transporting direction.

Disposed around the yellow photosensitive drum 7Y are a charger 8Y for charging the yellow photosensitive drum 7Y, a development bath 9Y filled with a yellow toner which corresponds to the yellow photosensitive drum 7Y, and a transfer unit 10Y which is faced with the yellow photosensitive drum 7Y through the transportation belt 5. A charger 8M, a development bath 9M and a transfer unit 10M are disposed around the magenta photosensitive drum 7M. A charger 8C, a development bath 9C and a transfer unit 10C are disposed around the cyan photosensitive drum 7C. A charger 8B, a development bath 9B and a transfer unit 10B are disposed around the black photosensitive drum 7B.

A laser diode 11B for emitting a laser beam which corresponds to a black image signal, a laser diode 11C for emitting a laser beam which corresponds to a cyan image signal, a laser diode 11M for emitting a laser beam which corresponds to a magenta image signal, and a laser diode 11Y for emitting a laser beam which corresponds to a yellow image signal are disposed in this order to one diode substrate 12 above the printer main body 1. A polygon mirror 13 is disposed which serves as a scanning mirror for scanning the laser beams from the respective laser diodes 11. A scanning motor 14 is disposed which drives and rotates the polygon mirror 13. The laser diodes 11Y, 11M, 11C and 11B are arranged in such a manner that the respective laser beams are emitted parallel to each other onto the polygon mirror 13.

The multi-color laser printer comprises a reflection mirror 15 which reflects the laser beams indicative of the respective colors which are scanned by the polygon mirror 13 so that the laser beams intersect with each other at the same intersection B and thereafter impinge upon the respective photosensitive drums 7Y, 7M, 7C and 7B which correspond to the respective colors to thereby expose surfaces of the respective photosensitive drums 7Y, 7M, 7C and 7B.

To reflect the respective laser beams so that the laser beams impinge upon the associated photosensitive drums 7Y, 7M, 7C and 7B, past the intersection B, the reflection mirror 15 is formed by combining four plane mirrors which correspond to the laser beams which are indicative of the respective colors. The plane mirrors, which are made of polycarbonate obtained by molding a resin and the like, are formed by evaporating aluminum onto mirror surfaces.

On the photosensitive drums side and in the vicinity of the intersection B of the laser beams which are indicative of the respective colors, a scanning correcting lens 16 is disposed which serves as beam correcting means for correcting optical paths of the laser beams which are indicative of the respective colors. The scanning correcting lens 16 is an acrylic lens which is obtained by fine molding a resin, for example, and includes lens surfaces which correspond to the laser beams which are indicative of the respective colors.

Now, a circuitry structure of the multi-color laser printer will be described. As shown in FIG. 2, as parts and components which form an electric circuit, the multi-color laser printer comprises an interface 17, a central processing unit (CPU) 18, a laser scanning device 19, a main motor 24, a main motor driver 25, a heater 26, a thermistor 27, a fixing control circuit 28, a paper feeding clutch 29, and development units 30Y, 30M, 30C and 30B.

The interface 17 is disposed to receive a signal from outside the multi-color laser printer. The central processing unit (CPU) 18 supplies image signals which are processed by predetermined signal processing in advance to thereby control the respective parts in accordance with image information (i.e., printing information) which is received through the interface 17.

In addition to the scanning motor 14 and the laser diodes 11, the laser scanning device 19 comprises a scanning motor driver 20 for driving the scanning motor 14, a laser diode beam quantity control circuit 21 which controls the quantities of the beams emitted from the laser diodes 11, a laser position detecting sensor 22, and a laser position sensing circuit 23.

The main motor 24 is a drive source for driving the printer. The main motor driver 25 drives the main motor 24.

The heater 26 is disposed within the fixing unit 6 to perform fixing. The thermistor 27 detects the temperature of the fixing unit 6. The fixing control circuit 28 controls energizing of the heater 26 in accordance with a result of detection conducted by the thermistor 27, to thereby control a fixing temperature at the fixing unit 6. The paper feeding clutch 29 controls timing at which the pick up roller 4 feeds a paper.

In addition to the yellow photosensitive drum 7Y, the charger 8Y and the transfer unit 10Y described earlier, the development unit 30Y for yellow comprises a developing member 31Y which is disposed within the development bath 9Y, and a high voltage control circuit 32Y for controlling a voltage which is applied to the respective parts 7Y, 8Y, 10Y and 31Y to thereby control the respective parts 7Y, 8Y, 10Y and 31Y. The development units 30M, 30C and 30B respectively for magenta, cyan and black each have the same structure as that of the yellow development unit 30Y.

Now, operations of the multi-color laser printer which have such a structure described above will be described. In accordance with image information (i.e., printing information) which is received through the interface 17, the CPU 18 drives and controls the main motor 24 by means of image signals which are processed by predetermined signal processing in advance. The pick up roller 4, the photosensitive drums 7Y, 7M, 7C and 7B, and the developing members 31Y, 31M, 31C and 31B are rotated through a drive gear (not shown) which is connected to the main motor 24, while at the same time a predetermined high voltage is applied to the chargers 8Y, 8M, 8C and 8B, the transfer units 10Y, 10M, 10C and 10B, the developing members 31Y, 31M, 31C and 31B, and the photosensitive drums 7Y, 7M, 7C and 7B.

The CPU 18 outputs signals which respectively drive the laser diodes 11Y, 11M, 11C and 11B corresponding to yellow, magenta, cyan and black, respectively, in accordance with the image signals, while at the same time driving a solenoid of the paper feeding clutch 29 so that the paper 2 is picked up and fed onto the transportation belt 5. When a first paper position sensor (not shown) detects the transportation of the paper 2 and outputs an ON signal, the CPU 18 drives the laser diode 11Y which corresponds to yellow so that the laser diode 11Y irradiates a laser beam onto the polygon mirror 13.

The laser beam which corresponds to yellow is scanned as the scanning motor 14 of the polygon mirror 13 rotates, is reflected by the reflection mirror 15, and travels through the intersection B. Thereafter the laser beam is corrected by the scanning correcting lens 16, and a charged surface of the associated yellow photosensitive drum 7Y is exposed to the corrected laser beam. An electrostatic latent image appears as a potential at the exposed surface of the yellow photosensitive drum 7Y decreases. As the photosensitive drum 7Y rotates, the developing member 31Y attaches a yellow toner from the yellow development bath 9 onto the portion at which the electrostatic latent image is formed, whereby a toner image is formed, and the transfer unit 10Y transfers the toner image onto the paper 2 which is transported by the transportation belt 5.

The paper 2 with the yellow toner image transferred thereonto is transported by the transportation belt 5, and following this, through operations which are identical to the operation described above, magenta, cyan and black toner images are transferred over the yellow toner image, so that a color toner image is formed on the paper 2. The paper 2 with the color toner image formed thereon is transported by the transportation belt 5, and the fixing unit 6 fixes the color toner image on the paper 2, whereby an image is formed on the paper 2.

In the structure described above, the laser beams which are indicative of the respective colors from the laser diodes 11Y, 1M, 11C and 11B are emitted parallel to each other onto the polygon mirror 13, impinge upon the same reflection surface of the polygon mirror 13, and being scanned and reflected at the reflection surfaces of the plane mirrors of the reflection mirror 15 corresponding to the respective colors. After all the laser beams, which travel through the intersection B, intersect with each other at the intersection B, surfaces of the associated photosensitive drums 7Y, 7M, 7C and 7B which are disposed for the respective colors are exposed to the light beams. Hence, it is possible to reflect the laser beams which are indicative of the respective colors by the only one reflection mirror 15.

Further, since the scanning correcting lens 16 is in the vicinity of the intersection B of the laser beams which are indicative of the respective colors, the optical paths of the laser beams representing the respective colors do not yet expand in a wide range, and therefore, it is possible to form the scanning correcting lens 16 compact which corrects the laser light which are indicative of the respective colors.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An image forming apparatus comprising:
   a plurality of image carriers;
   a plurality of charging means for charging the respective image carriers;
   light beam generating means for generating a plurality of light beams to which the image carriers are exposed so that an electrostatics latent image is formed on each image carrier in accordance with image signals; and
   a plurality of developing agent supplying means for supplying a developing agent which develops the electrostatic latent images on the respective image carriers,
   the image forming apparatus further comprising:
   a scanning mirror for scanning the plurality of light beams from the light beam generating means; and
   a reflection mirror for causing the plurality of light beams which are scanned by the scanning mirror, to intersect with each other at one and the same point, and thereafter irradiating the plurality of light beams respectively onto the image carriers.

2. The image forming apparatus of claim 1, wherein the light beam generating means emits the respective light beams parallel to each other toward the scanning mirror in the image forming apparatus.

3. The image forming apparatus of claim 1, further comprising:
   light beam correcting means for correcting the plurality of light beams, the light beam correcting means being disposed in a vicinity of the intersection of the plurality of light beams which are reflected by the reflection mirror, on the image carriers side.

4. The image forming apparatus of claim 1, wherein the respective image carriers are disposed on a concentric circle about the intersection of the plurality of light beams which are reflected by the reflection mirror.

* * * * *